Oct. 22, 1929.                    R. LITTLER, SR                    1,732,851
                    SAFETY DEVICE FOR AUTOMOBILE STARTERS
                              Filed Oct. 27, 1927
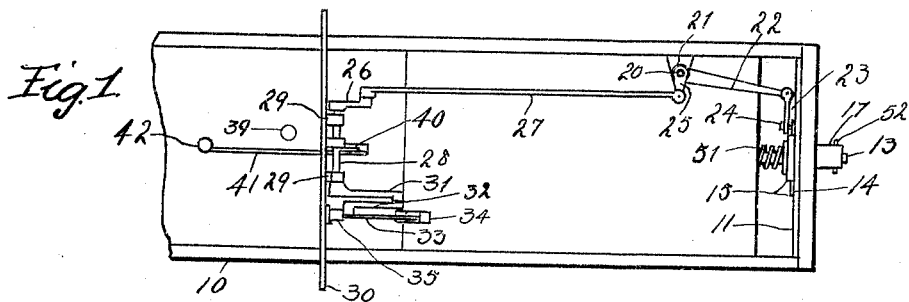
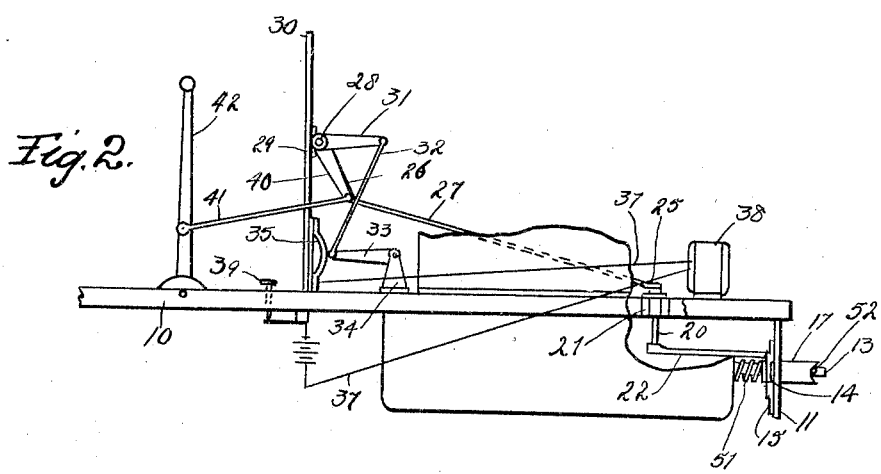
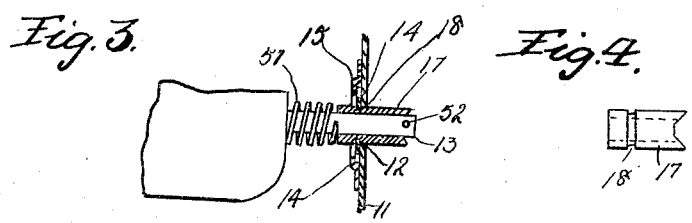
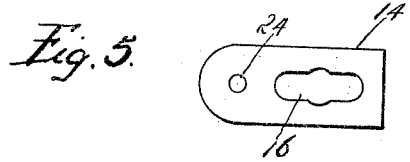
Inventor
Robert Littler Sr.
By W. W. Williamson Patented Oct. 22, 1929

1,732,851

UNITED STATES PATENT OFFICE

ROBERT LITTLER, SR., OF PHILADELPHIA, PENNSYLVANIA, ASSIGNOR TO MARTHA E. LITTLER, OF PHILADELPHIA, PENNSYLVANIA

SAFETY DEVICE FOR AUTOMOBILE STARTERS

Application filed October 27, 1927. Serial No. 229,153.

My invention relates to new and useful improvements in devices for automobile starters, and has for its object to provide an exceedingly simple and effective device which will eliminate the possibility of starting the engine of an automobile either by cranking or by the usual electric starter unless the shifting mechanism is in neutral, by the use of a member slidable upon the cranking shaft and spring actuated in one direction, coacting with locking mechanism for holding the sliding member in its safety position.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:

Fig. 1, is a plan view of a portion of an automobile chassis showing my present improved safety device applied thereto.

Fig. 2, is a side elevation of Fig. 1.

Fig. 3, is an enlarged sectional view of the slide plate and keeper, the engine shaft being in elevation.

Fig. 4, is a detail view of the shield.

Fig. 5, is a detail view of the slide plate.

In carrying out my invention as herein embodied, 10 represents a portion of an automobile carrying the apron 11 in the front thereof, which apron has the usual hole or opening 12 for the passage of the engine shaft 13.

14 represents the safety slide plate which is mounted in the guideways 15 so as to slide back and forth crosswise of the hole 12, and in this slide plate is formed the button hole slot 16; the two end portions of said slot being of less width than the central portion thereof for the purpose hereinafter explained.

17 represents a shield which is intended to fit over the projecting end of the shaft 13 and through the slot 16 in the safety slide plate, and this shield has an annular groove 18, in which the edges of the narrow portions of the slot 16 slide.

When these edges are in this groove, the shield cannot be moved longitudinally upon the shaft, and therefore a crank cannot be applied to the shaft for cranking the engine, and this condition is maintained at all times when the gear shifting lever of the automobile is not in neutral, as hereinafter explained; but when this lever is in neutral the enlarged portion of the slot 16 coincides with the axis of the shield 17, and thus permits the shield to be forced backward against the action of the spring 51 during the application of a crank to the shaft 13.

The shield 17 is secured against removal from the shaft and its outward movement limited by the pin 52, which latter is the means by which the ordinary crank takes hold of the engine shaft 13 for starting the engine.

The spring 51 is coiled about the shaft 13 and normally forces the shield outward against the pin 52.

20 represents a short shaft journalled in the bearing 21, the latter being mounted on the frame of the machine and the lower end of this short shaft carries the arm 22 which is connected by the link 23 with the safety slide plate 14, by the stud 24.

The upper end of the short shaft 20 carries the short lever 25 and this short lever is connected with the lever 26 by the connecting rod 27; the lever 26 being secured on one end of the horizontal shaft 28, the latter being mounted in suitable bearings 29 secured to the instrument board 30 or some other convenient portion of the machine. Upon the opposite end of this horizontal shaft 28 is secured a lever 31 to which is pivoted the connecting rod 32, the lower end of said rod being pivoted to the electric actuating switch bar 33 which latter is pivoted to the bracket 34 mounted upon the machine.

35 represents the movable member of an electric switch or circuit closer so mounted that when the bar 33 is in the position shown in Fig. 2, the circuit 37, which includes the starting motor 38 will be closed with the exception of the foot switch 39, so that the actuation of this switch 39 will permit the motor 38 to be put into operation in the usual manner; but when the connecting bar 33 is drawn out of contact with the movable member 35, this circuit will be opened, and therefore, the motor cannot be started even though the foot switch 39 is closed.

40 represents an arm secured to the horizontal shaft 28, and this arm is connected by a rod 41 to the ordinary gear shifting lever 42, from which it will be seen that when this lever is in the position representing neutral, here shown as being vertical, the starting motor may be put in operation or a crank may be applied to the projecting portion of the engine shaft 13, for starting the engine manually, but when the lever 42 is moved either forward or backward, the mechanism previously described will open the circuit through the movable member 35 and will shift the slide plate 14 to one side or the other, thus carrying the enlarged portion of the slot 16 out of alignment with the shield 17 thereby preventing the running of the starting motor or the application of a crank for starting the engine.

From the foregoing description, it will be obvious that the engine of an automobile equipped with my present improved safety device cannot be started when the transmission is in gear, thus entirely avoiding the many and serious accidents and loss of life incident to the present construction of said machines.

The gist of my invention rests in the broad idea of preventing the manual cranking or power starting of the engine of a motor vehicle when the transmission is set for transmitting power from the engine to the driving wheels of the vehicle, and I, therefore, do not wish to limit myself to the details of construction here shown as these may be varied within the scope of the appended claims without departing from the spirit of my invention.

Having thus fully described my invention, what I claim as new and useful is:

1. A safety device for automobiles, comprising a shield slidably mounted upon the cranking shaft of the engine and prevented from removal by the cranking pin of said shaft; means for normally maintaining said shield in contact with said pin to prevent the application of a crank; and means for locking the shield against sliding while the transmission mechanism is out of neutral.

2. In combination with the cranking shaft of an automobile, a shield mounted upon said shaft so as to have a sliding movement thereon; a cranking pin secured to the shaft against which pin the shield is normally held; a spring for normally holding said shield against said pin, but permitting said shield to be forced away from the pin when a crank is placed upon said shaft; means for locking the shield against sliding to prevent a crank from being applied to the shaft; and means for operating the last named means and also controlling an electric starter.

3. In combination with an internal combustion engine and the cranking shaft thereof, a spring actuated shield mounted to slide upon said shaft and normally occupying the outer end thereof to prevent application of a crank to said shaft; a slide plate having a slot therein, a portion of said slot being of larger diameter than the diameter of the body of said shield and other portions of said slot being sufficiently narrow for their edges to pass into a groove formed in the shield, for locking the shield against sliding; and means for moving the slide plate back and forth.

4. In combination with the cranking shaft of an internal combustion engine, said shaft carrying a cranking pin, a shield spring pressed against said pin and means for locking said shield against longitudinal movement for preventing the application of a crank to said shaft and pin; and means under the control of the transmission shifting mechanism of the engine for actuating said locking mechanism.

5. In a device of the kind described, an engine, power transmission mechanism, devices controlling the latter, a crank shaft adapted to receive a starting crank, a pin carried by the shaft to connect the crank thereto for transmitting motion to said shaft, a shield mounted to slide lengthwise on the shaft and act as a barrier to prevent application of the crank to said shaft when the shield is held in its outermost position, means projectable into the path of travel of the shield to hold the same in the outermost position, means for transmitting motion from the devices controlling the power transmission mechanism to the holding means, and resilient means normally forcing the shield outward while permitting it to be moved inward when the holding means is withdrawn from the path of travel of said shield.

6. In a device of the kind described, an engine, power transmission mechanism, devices controlling the latter, a cranking shaft adapted to receive a starting crank, a pin carried by the shaft to connect the crank thereto for transmitting motion to said shaft, a shield slidably mounted on the shaft and coacting with the pin to prevent operative connection between said pin and crank, a plate slidably mounted for cross-wise movement relative to the shield and coacting therewith to hold said shield against sliding movement when projected behind a portion thereof, means for transmitting motion from the devices controlling the power transmission mechanism to said plate, means to normally hold the shield in co-operative relation with the pin while permitting displacement of said shield from the pin after the plate has been withdrawn and when the crank is applied to the shaft, a starting motor, an electric circuit including said motor, a source of electrical energy, and a switch, and means connecting the devices controlling the power transmission mechanism and said switch whereby the latter will be actuated simultaneously with the movements of the plate to close the switch when the plate is projected behind the shield and to open said switch when the plate is withdrawn.

In testimony whereof, I have hereunto affixed my signature.

ROBERT LITTLER, Sr.